United States Patent
Yang et al.

(10) Patent No.: US 10,306,718 B1
(45) Date of Patent: May 28, 2019

(54) LIGHT EMITTING DEVICE DRIVER APPARATUS WITH MULTIPLE DIMMING MODES AND CONVERSION CONTROL CIRCUIT THEREOF

(71) Applicant: RICHTEK TECHNOLOGY CORPORATION, Zhubei, Hsinchu (TW)

(72) Inventors: Meng-Hsun Yang, Tainan (TW); Chi-Hsiu Lin, Yunlin (TW); Wei-Ming Chiu, Hsinchu (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 16/160,789

(22) Filed: Oct. 15, 2018

Related U.S. Application Data

(60) Provisional application No. 62/590,331, filed on Nov. 23, 2017.

(30) Foreign Application Priority Data

May 7, 2018 (CN) .......................... 2018 1 0425438

(51) Int. Cl.
*H05B 33/00* (2006.01)
*H05B 33/08* (2006.01)
(Continued)

(52) U.S. Cl.
CPC .......... *H05B 33/0818* (2013.01); *H02M 1/08* (2013.01); *H02M 1/143* (2013.01); *H02M 3/157* (2013.01); *H05B 33/0845* (2013.01)

(58) Field of Classification Search
CPC .. H05B 33/0815; H05B 37/02; H05B 33/089;
H05B 33/0818; H05B 33/08; H05B 33/0845; H05B 33/0827; H05B 33/0887; H05B 41/2824; H05B 41/3927; H05B 33/0851; H05B 33/0863; H05B 33/0866; H05B 33/0884; H05B 37/0227; H05B 37/0263; H05B 37/0272; H05B 41/2828; H05B 33/0812; H05B 33/0824; H05B 33/083; H05B 33/0848; H05B 41/2827;
(Continued)

(56) References Cited

U.S. PATENT DOCUMENTS

| | | | | |
|---|---|---|---|---|
| 5,896,015 | A * | 4/1999 | Mader | H05B 41/3927 315/227 R |
| 2010/0079127 | A1* | 4/2010 | Grant | H02M 3/156 323/285 |
| 2014/0218657 | A1* | 8/2014 | Haruta | G09G 3/342 349/61 |

* cited by examiner

*Primary Examiner* — Monica C King
(74) *Attorney, Agent, or Firm* — Tung & Associates

(57) ABSTRACT

A light emitting device driver apparatus includes: an inductor; a power switch which switches the inductor to convert an input power to an output current for driving a light emitting device circuit; and a conversion control circuit. When a dimming signal exceeds a first dimming threshold, a reference current signal is generated according to the dimming signal, and a switch control signal controls the power switch according to a first PWM signal, such that the output current corresponds to the level of the dimming signal. When the dimming signal does not exceed the first dimming threshold, the reference current signal is clamped to a level corresponding to the first dimming threshold, and a second PWM signal is generated according to the dimming signal, wherein the second PWM signal enables the first PWM signal to generate the switch control signal to control the power switch.

19 Claims, 11 Drawing Sheets

(51) Int. Cl.
  *H02M 1/08* (2006.01)
  *H02M 1/14* (2006.01)
  *H02M 3/157* (2006.01)
(58) Field of Classification Search
  CPC ............ H05B 41/2855; H05B 33/0842; H05B
    33/086; H05B 37/0254; H05B 41/3925;
    H02M 3/157; H02M 3/156; H02M
    3/33507; H02M 1/0845; H02M
    2001/0009; H02M 2001/008; H02M
    2001/0012; H02M 2001/007; H02M
    1/4208; H02M 1/4225; H02M 3/158;
    H02M 3/1588; H02M 2001/0074; H02M
    3/07; H02M 3/155; H02M 3/1582; H02M
    3/1584; H02M 3/33592
  See application file for complete search history.

US 10,306,718 B1

LIGHT EMITTING DEVICE DRIVER APPARATUS WITH MULTIPLE DIMMING MODES AND CONVERSION CONTROL CIRCUIT THEREOF

CROSS REFERENCE

The present invention claims priority to U.S. 62/590,331, filed on Nov. 23, 2017, and to CN 201810425438.2, May 7, 2018.

BACKGROUND OF THE INVENTION

Field of Invention

The present invention relates to a light emitting device driver apparatus; particularly, it relates to a light emitting device driver apparatus with multiple dimming modes. The present invention also relates to a conversion control circuit for use in the light emitting device driver apparatus with multiple dimming modes.

Description of Related Art

FIGS. 1A and 1B show a prior art light emitting device driver apparatus (light emitting device driver apparatus 1) and a conversion control circuit (conversion control circuit 15) thereof. The light emitting device driver apparatus 1 controls the power switch SWN by the conversion control circuit 15, so as to switch the inductor L to convert an input power VDD to an output current IOUT to drive a light emitting device circuit 60. In FIG. 1B, the dimming control circuit 50 receives an analog (continuous) dimming signal DIM to generate a reference current signal IREF. The error amplifier circuit 20 generates an error amplified signal EAO according to a current related signal ISN and the reference current signal IREF. The comparator circuit 30 compares a ramp signal RMP and the error amplified signal EAO to generate a PWM signal PP to control the power switch SWN, such that the output current IOUT corresponds to the reference current signal IREF. From one perspective, the output current IOUT is controlled to correspond to the level of the dimming signal DIM. In other words, the output current IOUT can be controlled by adjusting the level of the dimming signal DIM, and the brightness of the light emitting device circuit 60 is correspondingly adjusted. This kind of dimming control is referred to as analog dimming control herein. Note that the ramp signal RMP may be for example another current related signal.

FIG. 2 shows characteristic curves corresponding to the prior art shown in FIG. 1B. The prior art shown in FIG. 1B has a drawback that: when the dimming signal DIM is at a lower level, the conversion curve of different dimming control circuits may vary one from another due to deviations in manufacture or due to mismatches among components in the conversion control circuit 50. Taking FIG. 2 as an example, when the dimming signal DIM is at a lower level such as V1, the output current IOUT generated by different dimming control circuits (cases 1-3 as shown in FIG. 2) may have different values respectively, such as ILED1, ILED and ILED3 as shown in FIG. 2. This kind of deviations is more perceivable when the dimming signal DIM is at a lower level, while, when the dimming signal DIM is at a higher level such as V2, the variation is smaller.

FIG. 3 shows a schematic diagram of a conversion control circuit (conversion control circuit 3) of another prior art light emitting device driver apparatus. The conversion control circuit 3 performs pulse width modulation to generate a PWM signal PP according to a fixed reference current signal IREF'. A dimming signal DIM' in PWM form modulates the PWM signal PP such that the output current IOUT (or ILED) is related to (for example proportional to) the duty ratio of the dimming signal for dimming control. In this prior art, the frequency of the PWM signal PP is higher than the frequency of the dimming signal DIM'. This kind of dimming control is referred to as digital dimming control or pulse width modulation (PWM) dimming control.

FIG. 4 shows characteristic waveforms corresponding to FIG. 3. The prior art in FIG. 3 has a drawback that the ripple of the current flowing through the light emitting string 61 is relatively larger (as compared to analog dimming), especially when the duty ratio of the dimming signal DIM' is low.

Compared to the prior arts in FIGS. 1 and 3, the present invention is advantageous in reducing the brightness deviation at lower brightness level in analog dimming control, and also in reducing the current ripple of the light emitting string in PWM dimming control.

SUMMARY OF THE INVENTION

From one perspective, the present invention provides a light emitting device driver apparatus, comprising: an inductor; a power switch, coupled to the inductor and configured to operably switch the inductor to convert an input power to an output current to drive a light emitting device circuit; and a conversion control circuit, configured to operably control the power switch; the conversion control circuit including: a modulation circuit, configured to operably perform a pulse width modulation according to a current related signal and a reference current signal to generate a first PWM signal, wherein the modulation circuit controls the current related signal such that the current related signal corresponds to the reference current signal, wherein the current related signal relates to the output current; a logic driving circuit, configured to operably generate a switch control signal according to the first PWM signal and a second PWM signal to control the power switch to generate the output current; and a dimming control circuit, configured to operably generate the reference current signal according to a dimming signal, wherein: when the dimming signal exceeds a first dimming threshold, the reference current signal is generated according to a level of the dimming signal, and the switch control signal controls the power switch according to the first PWM signal, such that the output current corresponds to the level of the dimming signal, whereby an analog dimming control is performed; and when the dimming signal does not exceed the first dimming threshold, the reference current signal is clamped to a level which corresponds to the first dimming threshold, and the second PWM signal is generated according to the level of the dimming signal, wherein a frequency of the second PWM signal is lower than a frequency of the first PWM signal; wherein the second PWM signal enables the first PWM signal to generate the switch control signal to control the power switch, wherein, during an enable period of the second PWM signal, the output current corresponds to the first dimming threshold, and during a disable period of the second PWM signal, the power switch is controlled to be OFF, whereby a pulse width modulation dimming control is performed.

In one embodiment, the modulation circuit includes: an error amplifier circuit, configured to operably generate an error amplified signal according to a difference between the current related signal and the reference current signal; and a first comparator circuit, configured to operably compare a first ramp signal and the error amplified signal to generate the first PWM signal.

In one embodiment, the dimming control circuit includes: a reference current generator circuit, configured to operably convert a dimming reference signal to generate a reference current signal; a signal selection circuit, configured to operably compare the dimming signal and the first dimming threshold, wherein when the dimming signal exceeds the first dimming threshold, the dimming signal is selected as the dimming reference signal, and when the dimming signal does not exceed the first dimming threshold, the first dimming threshold is selected as the dimming reference signal; and a second comparator circuit, configured to operably compare the dimming signal and a second ramp signal to generate the second PWM signal.

In one embodiment, when the dimming signal exceeds the first dimming threshold, the reference current signal is proportional to the dimming signal by a predetermined ratio.

In one embodiment, a peak level of the second ramp signal is equal to the first dimming threshold.

In one embodiment, the error amplifier circuit includes: a transconductance circuit, configured to operably generate an error amplified current on a transconductance output terminal according to the difference of the current related signal and the reference current signal; a compensation capacitor, configured to operably integrate the error amplified current to generate the error amplified signal; and an integrator control switch, coupled between the transconductance output terminal and the compensation capacitor, wherein, when the dimming signal exceeds the first dimming threshold, the integrator control switch is controlled to conduct a current path from the error amplified current to the compensation capacitor, and when the dimming signal does not exceed the first dimming threshold, the integrator control switch is controlled to conduct the current path from the error amplified current to the compensation capacitor during the enable period of the second PWM signal, and is controlled to cut off the current path from the error amplified current to the compensation capacitor during the disable period of the second PWM signal.

In one embodiment, the light emitting device circuit includes: a light emitting device string, including a least one light emitting device; and an output capacitor, coupled to the light emitting device string in parallel, for reducing a current ripple flowing through the light emitting device string.

In one embodiment, when the dimming signal exceeds a second dimming threshold, the reference current signal is clamped to a level which corresponds to the second dimming threshold, whereby the output current is clamped to an upper current limit.

In one embodiment, the conversion control circuit receives the dimming signal through a single pin to achieve the analog dimming control and the pulse width modulation dimming control according to the level of the dimming signal.

In one embodiment, the conversion control circuit determines the first dimming threshold according to a deviation characteristic obtained from data of plural dimming control circuits.

From another perspective, the present invention provides a conversion control circuit, configured to operably control a light emitting device driver apparatus, the light emitting device driver apparatus including an inductor and a power switch which is coupled to the inductor, the power switch being configured to operably switch the inductor to convert an input power to generate an output current for driving a light emitting device circuit; the conversion control circuit, configured to operably control the power switch so as to control the light emitting device driver apparatus, comprising: a modulation circuit, configured to operably perform a pulse width modulation according to a current related signal and a reference current signal to generate a first PWM signal, wherein the modulation circuit controls the current related signal such that the current related signal is corresponded to the reference current signal, wherein the current related signal relates to the output current; a logic driving circuit, configured to operably generate a switch control signal according to the first PWM signal and a second PWM signal to control the power switch to generate the output current; and a dimming control circuit, configured to operably generate the reference current signal according to a dimming signal, wherein when the dimming signal exceeds a first dimming threshold, the reference current signal is generated according to a level of the dimming signal, and the switch control signal reflects the first PWM signal to control the power switch, such that the output current corresponds to the level of the dimming signal, whereby an analog dimming control is performed; when the dimming signal does not exceed the first dimming threshold, the reference current signal is clamped to a level which corresponds to the first dimming threshold, and the second PWM signal is generated according to the level of the dimming signal, wherein a frequency of the second PWM signal is lower than a frequency of the first PWM signal; wherein the second PWM signal enables the first PWM signal to generate the switch control signal to control the power switch, wherein, during the enable period of the second PWM signal, the output current corresponds to the first dimming threshold, and during the disable period of the second PWM signal, the power switch is controlled to be OFF, whereby a pulse width modulation dimming control is performed.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 5A:
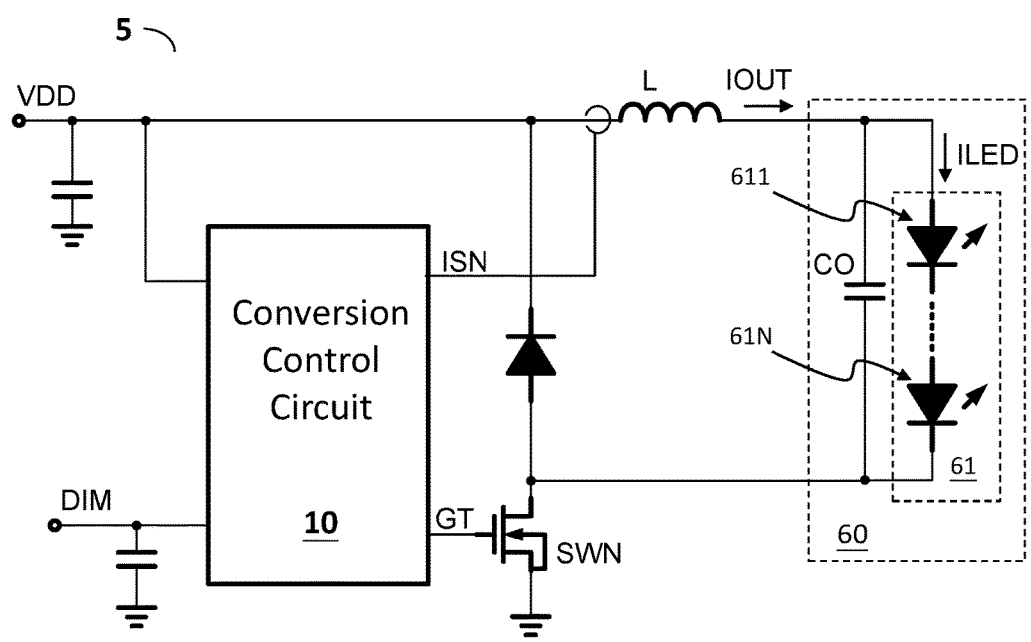
FIG. 5A shows a schematic diagram of an embodiment of the light emitting device driver apparatus according to the present invention.
Figure 5B:
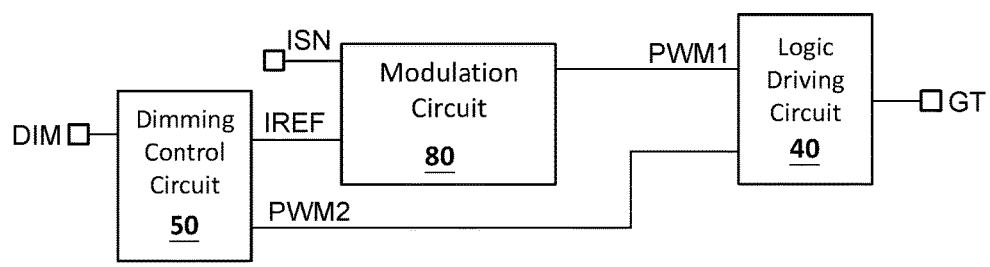
FIG. 5B shows a schematic diagram of an embodiment of a conversion control circuit of the light emitting device driver apparatus according to the present invention.

FIG. 5A shows a schematic diagram of an embodiment of the light emitting device driver apparatus (light emitting device driver apparatus 5) according to the present invention. FIG. 5B shows a schematic diagram of an embodiment of the conversion control circuit (conversion control circuit 10) of the light emitting device driver apparatus according to the present invention. The light emitting device driver apparatus 5 comprises an inductor L, a power switch SWN, and a conversion control circuit 10. The power switch SWN is coupled to the inductor L and is configured to operably switch the inductor L to convert an input power VDD to an output current IOUT to drive a light emitting device circuit 60. The conversion control circuit 10 is configured to operably control the power switch SWN for generating the output current IOUT. In one embodiment, the light emitting device circuit 60 includes a light emitting device string 61 which includes at least one light emitting device (for example but not limited to the light emitting devices 611-61N, wherein N is a natural number). In one embodiment, as shown in FIG. 5A, the light emitting device circuit 60 includes an output capacitor CO which is coupled to the light emitting device string 61 in parallel and is configured to filter the output current IOUT to reduce the current ripple flowing through the light emitting device string 61. In one embodiment, the power switch SWN and the inductor L can be configured as a buck converter as shown in FIG. 5A. In other embodiments, the power switch SWN and the inductor L can be configured as a boost converter, a buck-boost converter or a flyback converter.

Still referring to FIG. 5B, the conversion control circuit 10 includes a modulation circuit 80, a logic driving circuit 40, and a dimming control circuit 50. The modulation circuit 80 is configured to operably perform a pulse width modulation according to a current related signal ISN and a reference current signal IREF to generate a first PWM signal PWM1, wherein the current related signal ISN relates to the output current IOUT. The modulation circuit 80 controls the current related signal ISN such that the current related signal ISN is corresponding to the reference current signal IREF. In one embodiment, the modulation circuit 80 controls the current related signal ISN such that the level of the current related signal ISN is substantially equal to the level of the reference current signal IREF. The logic driving circuit 40 is configured to operably generate a switch control signal GT according to the first PWM signal PWM1 and a second PWM signal PWM2, for controlling the power switch SWN to generate the output current IOUT. How the second PWM signal PWM2 is generated will be described in detail later.

Figure 5C:
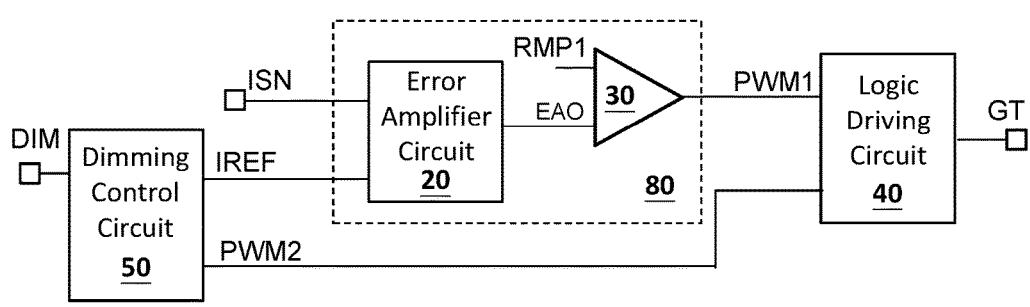
FIG. 5C shows a schematic diagram of an embodiment of a modulation circuit of the light emitting device driver apparatus according to the present invention.

FIG. 5C shows a schematic diagram of an embodiment of the modulation circuit (modulation circuit 80) of the light emitting device driver apparatus according to the present invention. In this embodiment, the modulation circuit 80 includes an error amplifier circuit 20 and a first comparator circuit 30. The error amplifier circuit 20 is configured to operably generate an error amplified signal EAO according to a difference between the current related signal ISN and the reference current signal IREF. The first comparator circuit 30 is configured to operably compare a first ramp signal RMP1 and the error amplified signal EAO to generate the first PWM signal PWM1. By feedback loop control, the two inputs of the error amplifier circuit 20 will be substantially equal to one the other, i.e., the level of the current related signal ISN will be substantially equal to the level of the reference current signal IREF.

In one embodiment, the first ramp signal RMP1 can be a ramp signal related to an inductor current, or a ramp signal irrelevant to current. The first ramp signal RMP1 can be of fixed frequency or non-fixed frequency. The current related signal ISN can be for example a continuous or discontinuous current related signal obtained by sensing the inductor current or sensing a current flowing through the power switch SWN. The current related signal ISN can be utilized as an input of the error amplifier circuit 20 and/or as the first ramp signal RAP1.

Note that the embodiment of the modulation circuit 80 in FIG. 5C is not for limiting the scope of the present invention. According to the present invention, in other embodiments, the modulation circuit can be other modulation circuit having a structure configured for pulse width modulation control, pulse frequency modulation control, constant ON time control, constant OFF time control or bang bang control, with fixed frequency or non-fixed frequency.

Figure 6:
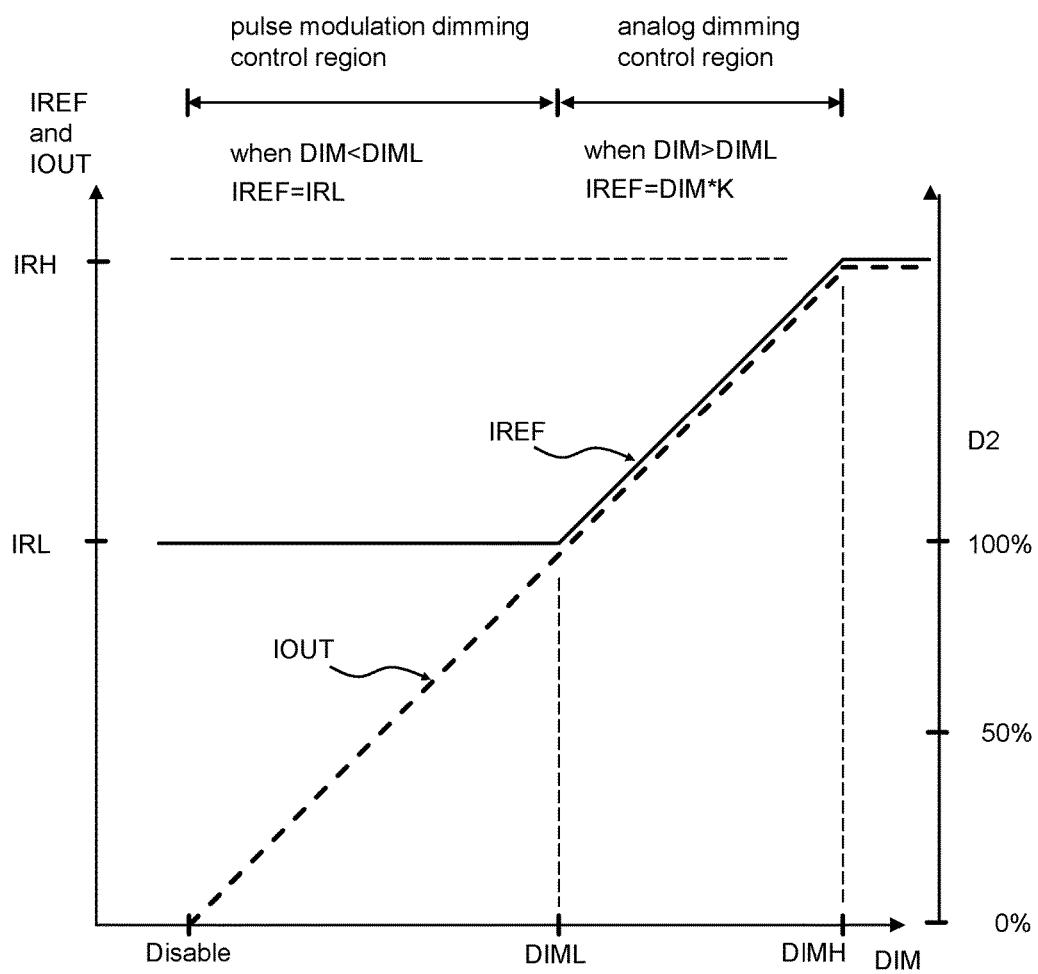
FIG. 6 shows characteristic curves corresponding to embodiments according to the present invention.

Referring to the FIGS. 5A-5C together with FIG. 6 which shows characteristic curves corresponding to embodiments according to the present invention, the dimming control circuit 50 is configured to operably generate the reference current signal IREF according to a dimming signal DIM, wherein when the dimming signal DIM exceeds a first dimming threshold DIML, the reference current signal IREF is generated according to a level of the dimming signal DIM, and the switch control signal GT controls the power switch SWN according to the first PWM signal PWM1, such that the output current IOUT corresponds to the level of the dimming signal DIM, whereby an analog dimming control is performed. More specifically, in one embodiment, when the dimming signal DIM exceeds the first dimming threshold DIML (for example in the analog dimming control region as shown in FIG. 6), the reference current signal IREF is proportional to the dimming signal DIM with a predetermined ratio K, wherein K is a real number. In one preferred embodiment, K is a positive real number. The error amplifier 20 together with other related circuits regulate the output current IOUT by PWM modulation and feedback control, such that the output current IOUT corresponds (for example but not limited to being equal to or with another predetermined ratio) to the reference current IREF, whereby the output current IOUT corresponds to the level of the dimming signal DIM.

In one embodiment, the first dimming threshold DIML can be a predetermined fixed value or an adjustable variable.

Figure 1A:
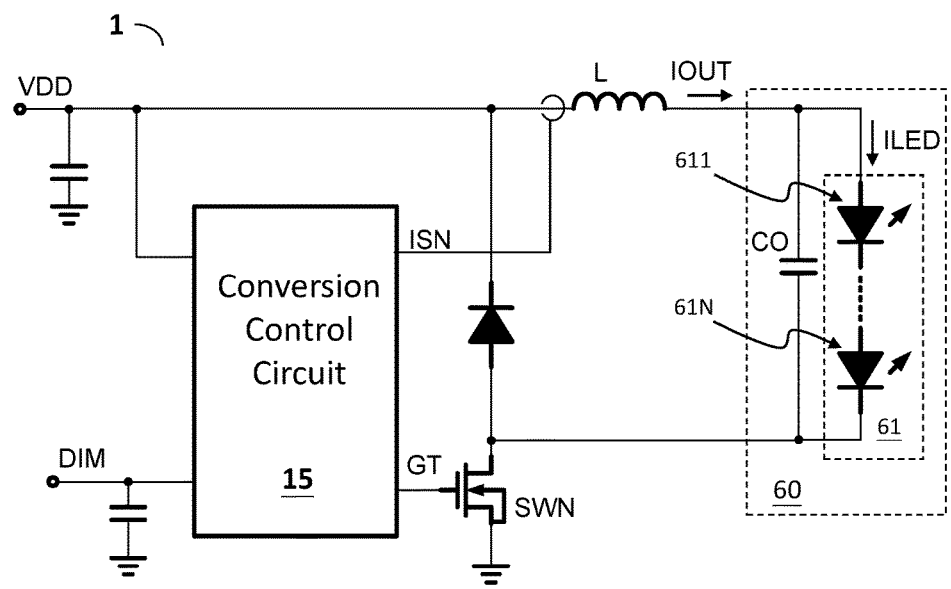
FIG. 1A shows a block diagram of a prior art light emitting device driver apparatus.
Figure 1B:
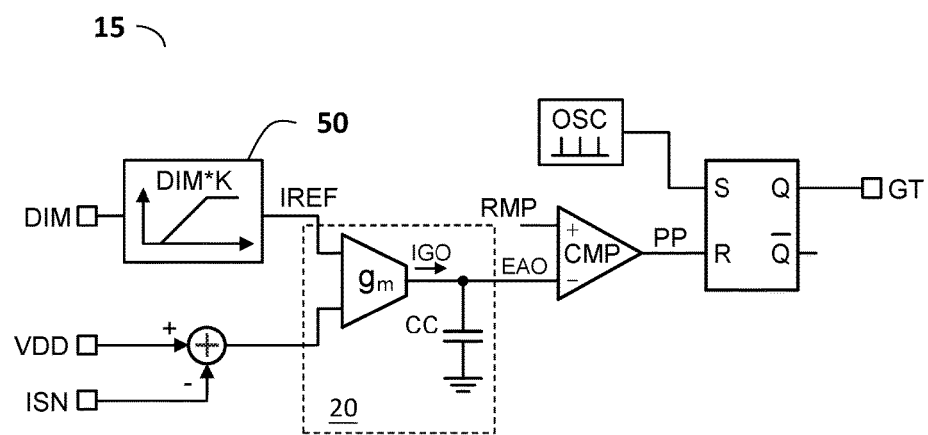
FIG. 1B shows a schematic diagram of a conversion control circuit of a prior art light emitting device driver apparatus.
Figure 2:
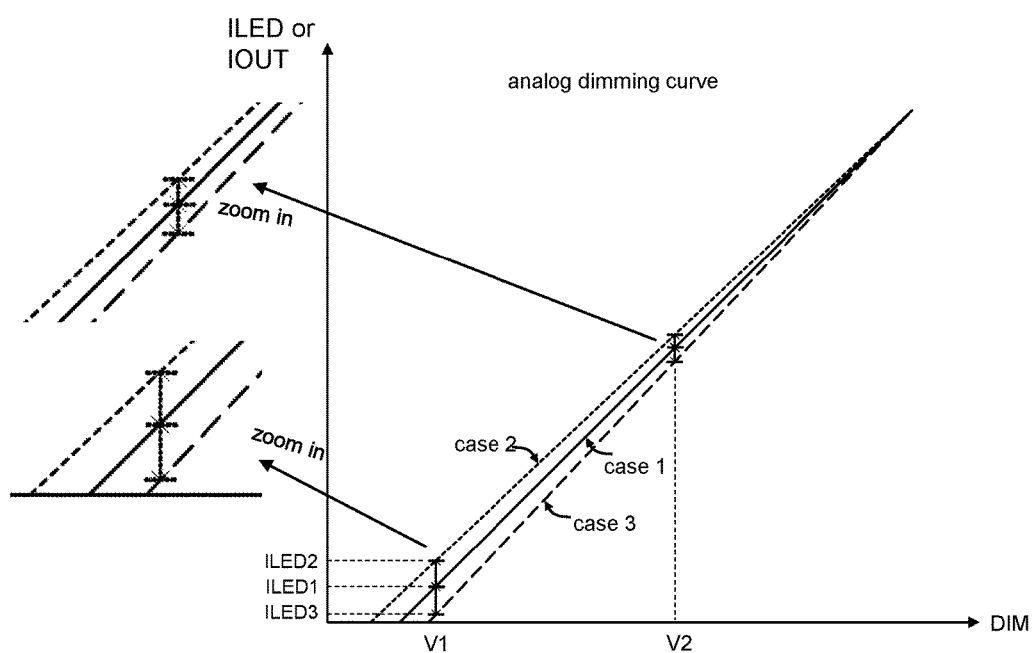
FIG. 2 shows characteristic curves corresponding to the circuit shown in FIG. 1B.

In one embodiment, the first dimming threshold DIML can be determined according to for example the deviation characteristics shown in the dimming curves in FIG. 2. In one embodiment, the first dimming threshold DIML can be a boundary value where the deviation starts to cause the dimming effect of different circuits to vary significantly (for example out of a tolerance range). In one embodiment, the conversion control circuit 10 determines the first dimming threshold DIML according to a deviation parameter of the dimming control circuit 50.

Still referring to FIGS. 5B and 6, when the dimming signal DIM does not exceed the first dimming threshold DIML (i.e. the pulse modulation dimming control region as shown in FIG. 6), the dimming control circuit 50 generates the reference current signal IREF according to the first dimming threshold DIML. In this embodiment, the first dimming threshold is a predetermined value, and when the dimming signal DIM does not exceed the first dimming threshold DIML, the current signal IREF is at a first current level IRL (wherein, for example, the ratio of the reference current signal IREF to the first dimming threshold DIML is the predetermined ratio K). From one perspective, the dimming control circuit 50 controls the reference current signal IREF to be clamped to a level which corresponds to the first dimming threshold DIML when the dimming signal DIM does not exceed the first dimming threshold DIML.

The aforementioned "pulse modulation dimming control region" indicates that within this region, the output current is modulated by "pulses" of the second pulse modulation signal PWM2. The modulation scheme can be for example but not limited to pulse width modulation (PWM), pulse amplitude modulation (PAM), other types of modulation schemes, or the combination thereof. The aforementioned "pulse modulation dimming control region" of the present invention will be described in detail later.

Figure 3:
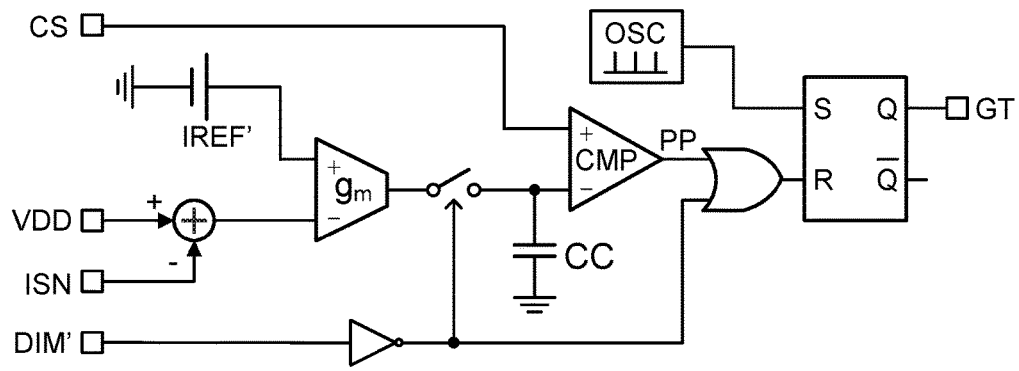
FIG. 3 shows a schematic diagram of a conversion control circuit of another prior art light emitting device driver apparatus.
Figure 4:
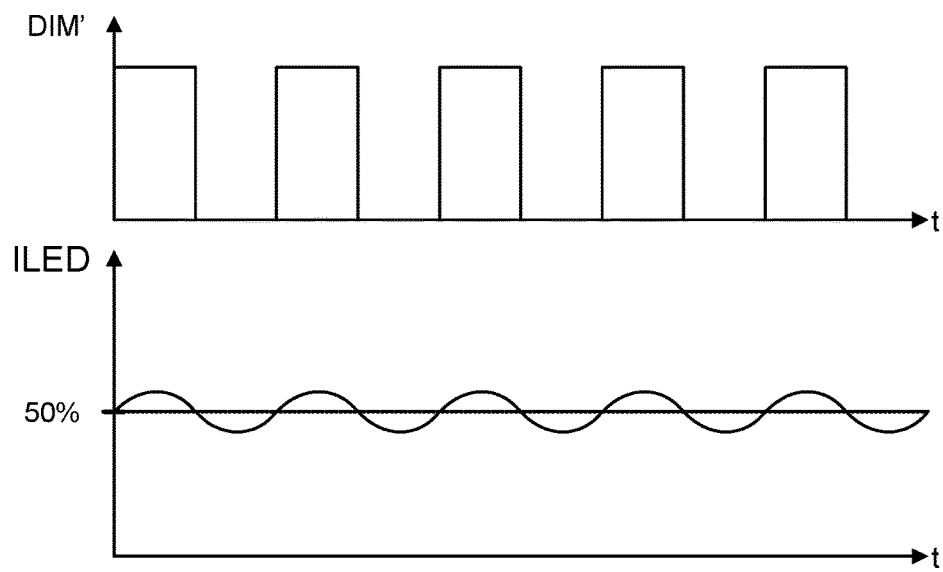
FIG. 4 shows characteristic waveforms of corresponding to the circuit shown in FIG. 3.
Figure 7A:
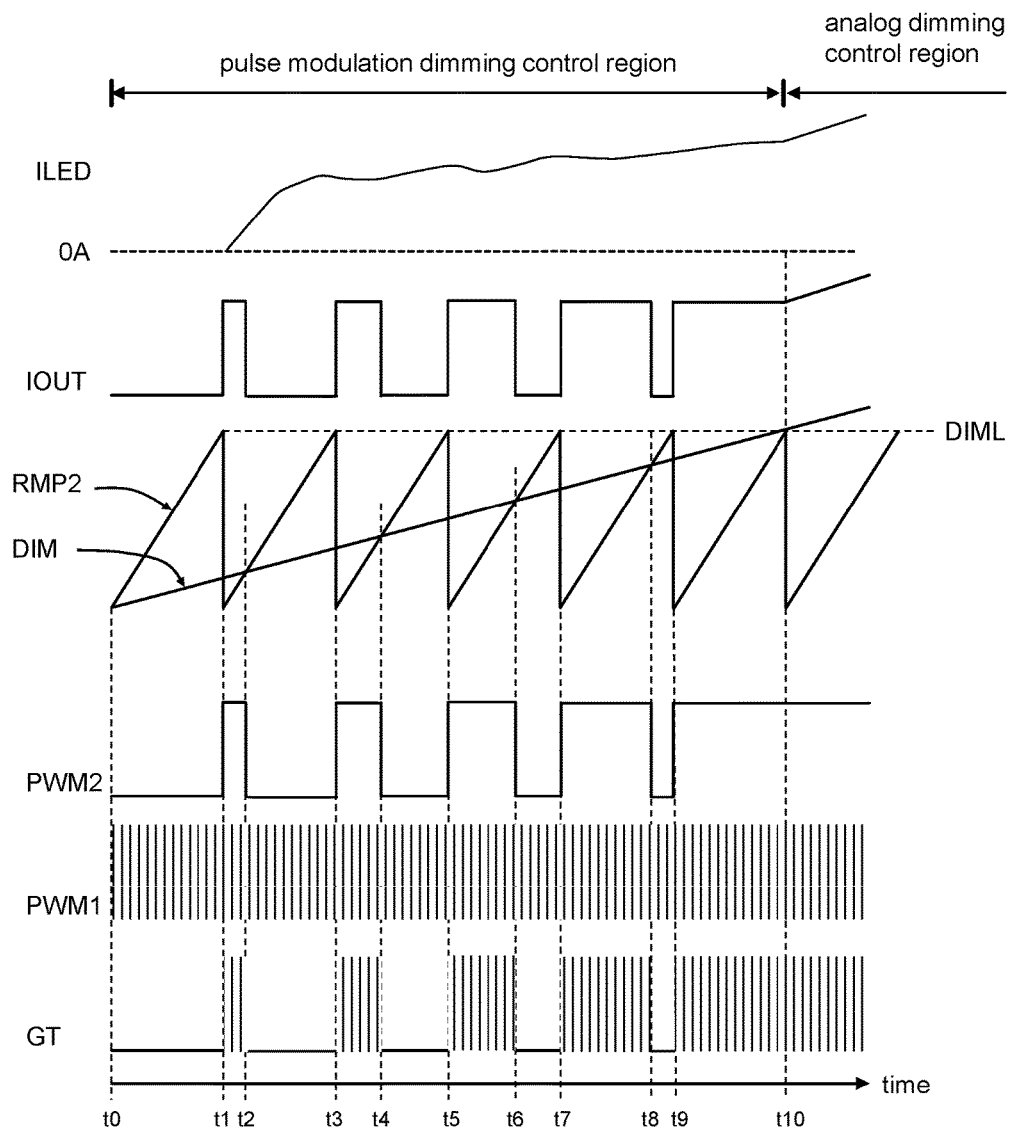
FIGS. 7A-7B show schematic waveforms corresponding to embodiments in FIGS. 5B, 5C and 6 according to the present invention.
Figure 7B:
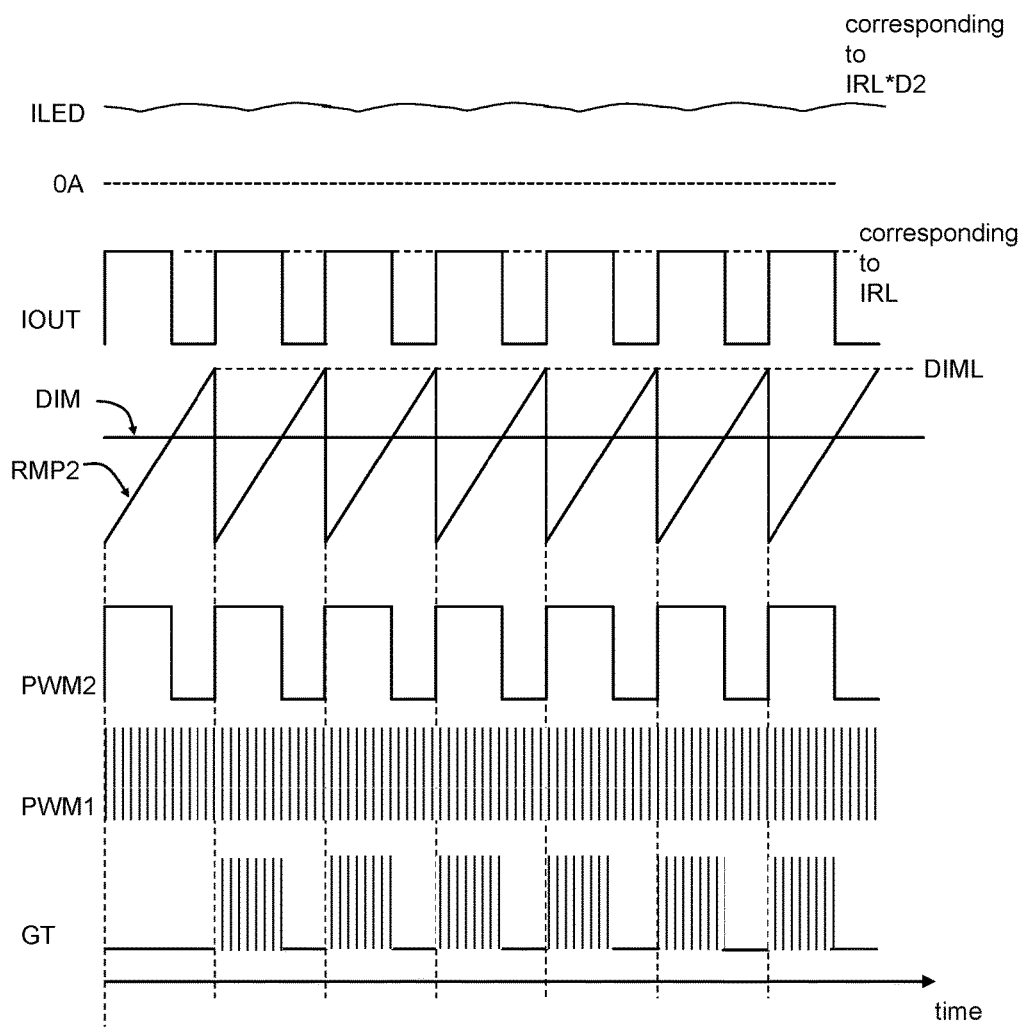

FIGS. 7A-7B show schematic waveforms corresponding to embodiments in FIGS. 5B, 5C and 6 according to the present invention. When the dimming signal DIM does not exceed the first dimming threshold DIML (i.e. within the "pulse modulation dimming control region"), the dimming control circuit 50 compares the dimming signal DIM with the second ramp signal RMP2 to generate the second PWM signal PWM2. In one embodiment, the frequency F2 of the second PWM signal PWM2 is lower than the frequency F1 of the first PWM signal PWM1. In one embodiment, the frequency F2 of the second PWM signal PWM2 can be for example 1 kHz, and the frequency F1 of the first PWM signal PWM1 can be for example 100 kHz. As shown in FIG. 7A, the second PWM signal PWM2 enables the first PWM signal PWM1 to generate the switch control signal GT to control the power switch SWN for generating the output current IOUT. During the enable period of the second PWM signal PWM2 (for example when PWM is at high state during t5-t6 as shown in FIG. 7A), the output current IOUT corresponds to the first dimming threshold DIML. Since IRL=DIML*K, from another perspective, during the enable period of the second PWM signal PWM2, the output current IOUT corresponds to the first current level IRL of the reference current signal IREF. In one embodiment, during the disable period of the second PWM signal PWM2 (for example when PWM is at low state during t6-t7 as shown in FIG. 7A), the power switch SWN is controlled to be OFF by the switch control signal GT. From one perspective, when the dimming signal DIM does not exceed the first dimming threshold DIML, the average of the output current IOUT corresponds to the first dimming threshold DIML multiplied by the duty ratio D2 of the second pulse modulation signal PWM2, whereby a pulse width modulation dimming control is performed. In other words, the average of the output current IOUT corresponds to the first current level IRL multiplied by the duty ratio D2 of the second pulse modulation signal PWM2. Note that, from one perspective, the light emitting device driver apparatus of the present invention has characteristics of both PWM and PAM, and is different from the prior art in FIG. 3 which employs PWM scheme only. However, this is not to limit the scope of the present invention. In one embodiment, the light emitting device driver apparatus of the present invention can only perform PWM scheme for dimming during the "pulse modulation dimming control region". In other words, in this embodiment, when the dimming signal DIM does not exceed the first dimming threshold DIML, the average of the output current IOUT can be configured to correspond to the second dimming threshold DIMH multiplied by the duty ratio D2 of the second pulse modulation signal PWM2, as shown in FIG. 6.

From another perspective, according to the present invention, when the dimming signal DIM does not exceed the first dimming threshold DIML, the average of the current ILED of the light emitting device string 61 (corresponding to the average of the output current IOUT) is adjusted by controlling the duty ratio of the second pulse modulation signal PWM2 for pulse modulation dimming. According to the present invention, when the dimming signal DIM exceeds the first dimming threshold DIML, the output current IOUT is controlled to correspond to the level of the dimming signal DIM, and when the dimming signal DIM does not exceed the first dimming threshold DIML, the dimming signal DIM is converted in a PWM form to control the output current IOUT to correspond to the first dimming threshold DIML multiplied by the duty ratio of the second pulse modulation signal PWM2. And since the second pulse modulation signal PWM2 is obtained by comparing the dimming signal DIM with the second ramp signal PWM2, in one embodiment, the analog dimming control region and the pulse modulation dimming control region in the dimming curve (i.e. IOUT vs. DIM as shown in FIG. 6) can be combined seamlessly (connected continuously) if the levels of the peak and valley of the second ramp signal RMP2 are properly selected. In one embodiment, when the peak level of the second ramp signal RMP2 is set to be the first dimming threshold DIML (as shown in FIG. 7A), the dimming curve is continuous and the two regions (the analog dimming control region and the pulse modulation dimming control region) are connected with each other at the first dimming threshold DIML (i.e. the joint of the two regions, of as shown FIG. 6). In one preferred embodiment, when the valley level of the second ramp signal RMP2 is set to be corresponding to the extension line of the dimming curve in the analog dimming control region, the slopes of the dimming curve in the analog dimming control region and the pulse modulation dimming control region are substantially the same (FIG. 6). From one perspective, when the peak level of the second ramp signal RMP2 is set to be the first dimming threshold DIML and when the dimming signal DIM exceeds the first dimming threshold DIML (for example after t10 in FIG. 7A), the switch control signal GT can still be regarded as being generated by the second pulse modulation signal PWM enabling the first pulse modulation signal PWM1, wherein the duty ratio of the second pulse modulation signal PWM2 is 100%.

Note that the selection of the peak and valley of the second ramp signal RMP2 described as above is for illustration and not for limiting the scope of the present invention. In other embodiments, the slopes of the dimming curve sections in the analog dimming control region and the pulse modulation dimming control region can be configured to be different, or the joint of the two regions can be discontinuous (in either axis or both axes) by selecting the peak and valley of the second ramp signal RMP2 different from the embodiment described above.

Figure 7C:
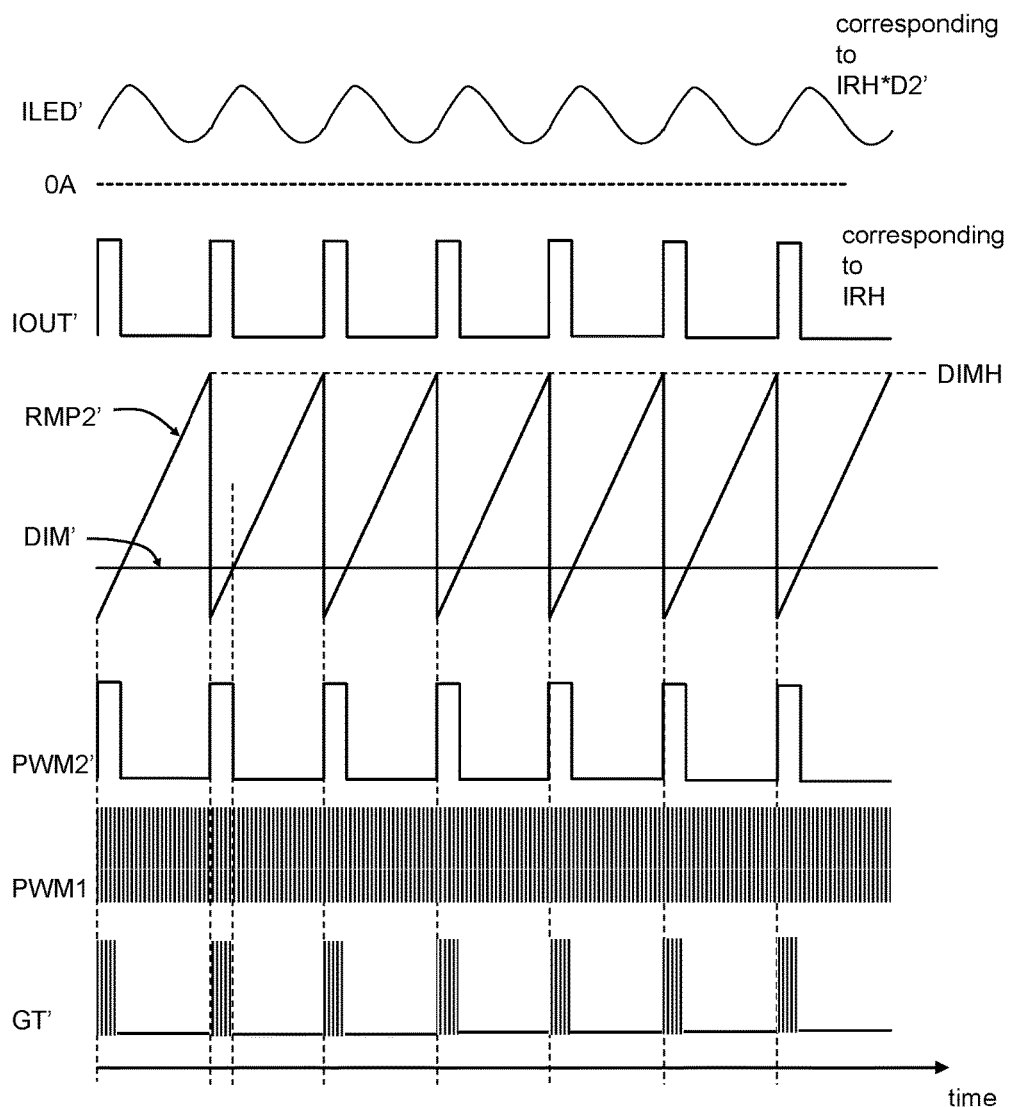
FIG. 7C shows schematic waveforms of a prior art light emitting device driver apparatus.

It is also worth noting that, according to the present invention, in the pulse modulation dimming control region, the current ILED flowing through the light emitting device string 61 has a smaller current ripple. FIGS. 7A-7B show schematic waveforms corresponding to the embodiments in FIGS. 5B, 5C and 6 according to the present invention. FIG. 7C shows schematic waveforms of a prior art (FIG. 3) light emitting device driver apparatus. According to the present invention, as previously described, during the enable period of the second PWM signal PWM2 and when the dimming signal DIM does not exceed the first dimming threshold DIML, the output current IOUT corresponds to the first dimming threshold DIML (i.e. corresponding to the first current level IRL of the reference current signal IREF as in FIG. 7B). In other words, with the same target output current level, during the enable period of the second pulse modulation signal PWM2, the light emitting device driver apparatus of the present invention performs pulse width modulation with a lower current level (e.g. corresponding to IRL as in FIG. 7B), which leads to a lower current amplitude (in PWM form) of the output current IOUT. Consequently, the current ripple of the current ILED flowing through the light emitting device string 61 can be effectively reduced (FIG. 7B). As a comparison, the prior art performs the pulse width modulation (e.g. PWM2' in FIG. 7C) with a higher current level (corresponding to IRH as shown in FIG. 7C), which leads to a higher current amplitude (in PWM form) of the output current IOUT'. Consequently, the current ripple of the current ILED flowing through the light emitting device string of the prior art is larger (FIG. 7C).

Also note that, according to the present invention, during the pulse modulation dimming control region, the dimming is still controlled by adjusting the level the dimming signal DIM, which is consistent with the analog dimming control and hence simplifies the application circuitry for generating the dimming signal DIM. In one embodiment, the conversion control circuit (e.g. conversion control circuit 10) can be an integrated circuit. In one embodiment, the conversion control circuit 10 receives the dimming signal DIM through a single pin (of the integrated circuit) to achieve both the analog dimming control and the pulse width modulation dimming control according to the level of the dimming signal DIM.

Figure 8A:
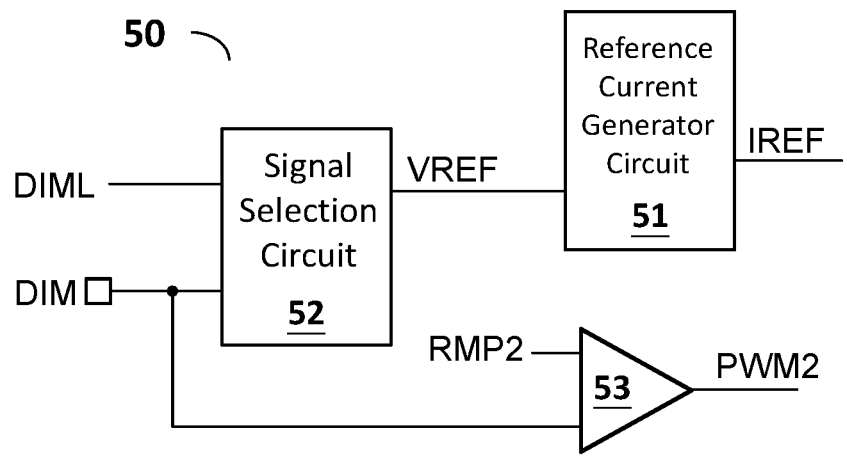
FIG. 8A shows a schematic diagram of a specific embodiment of the dimming control circuit of the light emitting device driver apparatus according to the present invention.

FIG. 8A shows a schematic diagram of a specific embodiment of the dimming control circuit (dimming control circuit 50) of the light emitting device driver apparatus according to the present invention. The dimming control circuit 50 includes: a reference current generator circuit 51, a signal selection circuit 52, and a second comparator circuit 53. The reference current generator circuit 51 is configured to operably convert the dimming reference signal VREF to generate the reference current signal IREF. In one embodiment, the ratio of the reference current signal IREF to the dimming reference signal VREF is the predetermined ratio K. In one embodiment, the signal selection circuit 52 is configured to operably compare the dimming signal DIM and the first dimming threshold DIML. When the dimming signal DIM exceeds the first dimming threshold DIML, the dimming signal DIM is selected as the dimming reference signal VREF. When the dimming signal DIM does not exceed the first dimming threshold DIML, the first dimming threshold DIML is selected as the dimming reference signal VREF. The second comparator circuit 53 is configured to operably compare the dimming signal DIM and a second ramp signal RMP2 to generate the second PWM signal PWM2.

Figure 8B:
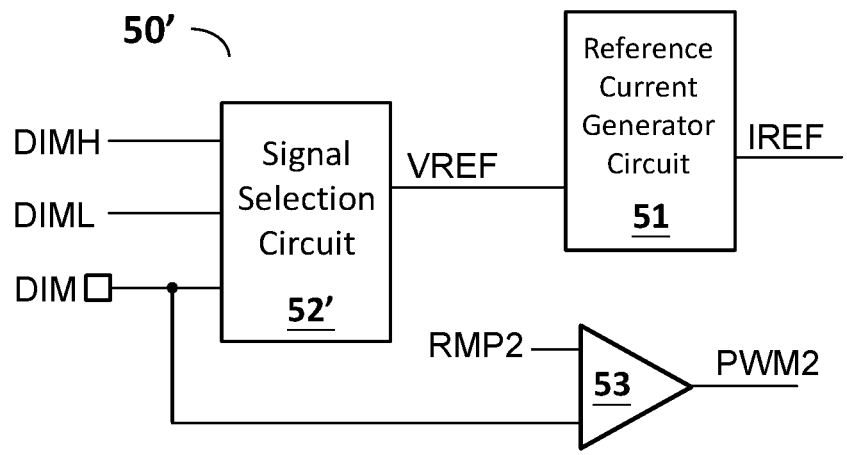
FIG. 8B shows a schematic diagram of another specific embodiment of the dimming control circuit of the light emitting device driver apparatus according to the present invention.

FIG. 8B shows a schematic diagram of another specific embodiment of the dimming control circuit (dimming control circuit 50') of the light emitting device driver apparatus according to the present invention. Referring to FIGS. 8B and 6, in one embodiment, when the dimming signal DIM exceeds a second dimming threshold DIMH, the dimming control circuit 50' clamps the reference current signal IREF a level which corresponds to the second dimming threshold DIMH, whereby the output current IOUT is clamped to an upper current limit. In one embodiment, as shown in FIG. 8B, when the dimming signal DIM exceeds a second dimming threshold DIMH, the signal selection circuit 52' selects the second dimming threshold DIMH as the dimming reference signal VREF. In one embodiment, the second dimming threshold DIMH is higher than the first dimming threshold DIML.

Figure 8C:
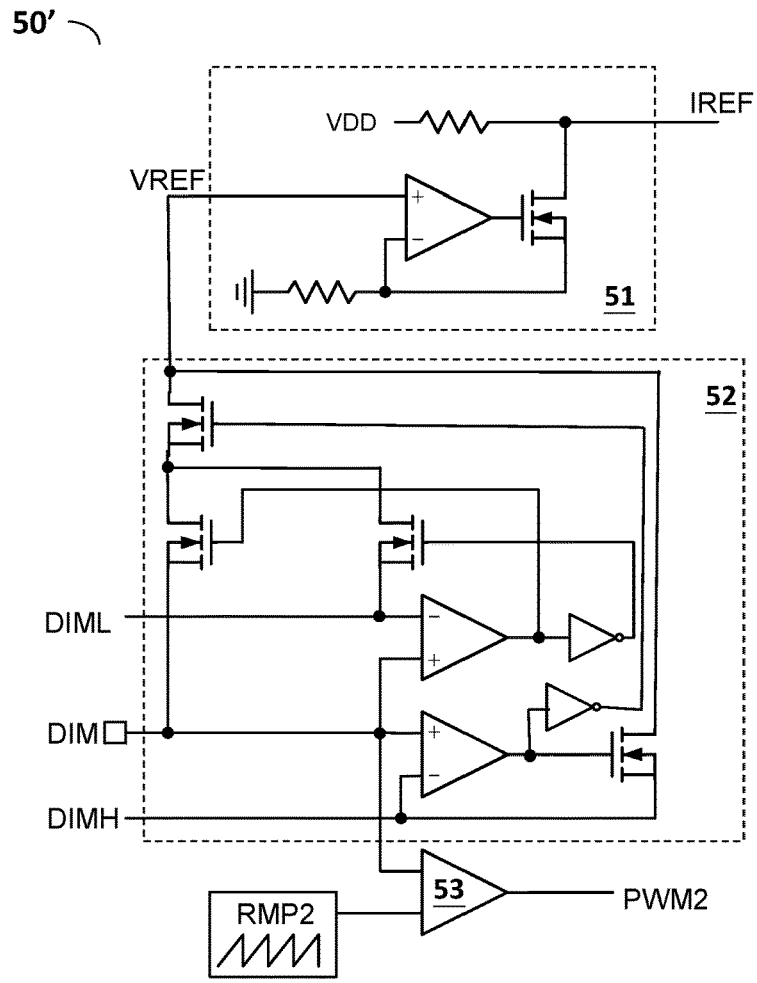
FIG. 8C shows a schematic diagram of a more specific embodiment of the dimming control circuit of the light emitting device driver apparatus according to the present invention.

FIG. 8C shows a schematic diagram of a more specific embodiment of the dimming control circuit (dimming control circuit 50') of the light emitting device driver apparatus according to the present invention. In one embodiment, the signal selection circuit 52 includes plural comparators and selection switches, which are configured to select one of the dimming signal DIM, the first dimming threshold DIML or the second dimming threshold DIMH as the dimming reference signal VREF. In one embodiment, the reference current generator circuit 51 is a linear amplifier circuit which is configured to convert the dimming reference signal VREF to the reference current signal IREF, wherein the ratio between the reference current signal IREF and the dimming reference signal VREF is determined by the resistors as shown in FIG. 8C.

Figure 9:
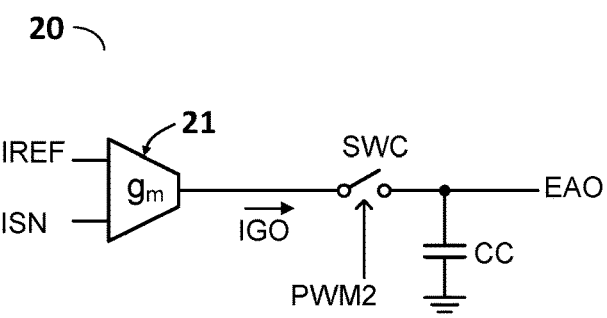
FIG. 9 shows a schematic diagram of a specific embodiment of the error amplifier circuit of the light emitting device driver apparatus according to the present invention.

FIG. 9 shows a schematic diagram of a specific embodiment of the error amplifier circuit (error amplifier circuit 20) of the light emitting device driver apparatus according to the present invention. The error amplifier circuit 20 includes a transconductance circuit 21, a compensation capacitor CC, and an integrator control switch SWC. The transconductance circuit 21 is configured to operably generate an error amplified current IGO on a transconductance output terminal GO according to the difference between the current related signal ISN and the reference current signal IREF. The compensation capacitor CC is configured to operably integrate the error amplified current IGO to generate the error amplified signal EAO. The integrator control switch SWC is coupled between the transconductance output terminal GO and the compensation capacitor CC. When the dimming signal DIM exceeds the first dimming threshold DIML, the integrator control switch SWC is controlled to conduct a current path from the error amplified current IGO to the compensation capacitor CC, and when the dimming signal DIM does not exceed the first dimming threshold DIML, the integrator control switch SWC is controlled to conduct the current path from the error amplified current IGO to the compensation capacitor CC during the enable period of the second PWM signal PWM2, but is controlled to cut off the current path from the error amplified current IGO to the compensation capacitor CC during the disable period of the second PWM signal PWM2. Thus, the voltage across the compensation capacitor CC is maintained during the disable period of the second pulse modulation signal PWM2 by cutting off the current path from the error amplified current IGO to the compensation capacitor CC, so that when the second PWM signal PWM2 is enabled for the next time, the light emitting device driver apparatus of the present invention can re-start from the steady state in the previous enable period of the second PWM signal PWM2 and does not require a soft start as often required in the power up stage of a conventional light emitting device driver apparatus, whereby the dimming is better controlled.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. In addition, when it is described that a parameter "is" or "is equal to" a number, it does not require that the parameter "exactly is" or "is precisely equal to" the number; a certain tolerable error is acceptable. The spirit of the present invention should cover all such and other modifications and variations, which should be interpreted to fall within the scope of the following claims and their equivalents.

What is claimed is:

1. A light emitting device driver apparatus, comprising:
   an inductor;
   a power switch, coupled to the inductor and configured to operably switch the inductor to convert an input power to an output current to drive a light emitting device circuit; and
   a conversion control circuit, configured to operably control the power switch; the conversion control circuit including:
      a modulation circuit, configured to operably performa pulse width modulation according to a current related signal and a reference current signal to generate a first PWM signal, wherein the modulation circuit controls the current related signal such that the current related signal corresponds to the reference current signal, wherein the current related signal relates to the output current;
      a logic driving circuit, configured to operably generate a switch control signal according to the first PWM signal and a second PWM signal to control the power switch to generate the output current; and
      a dimming control circuit, configured to operably generate the reference current signal according to a dimming signal,
      wherein:
         when the dimming signal exceeds a first dimming threshold, the reference current signal is generated according to a level of the dimming signal, and the switch control signal controls the power switch according to the first PWM signal, such that the output current corresponds to the level of the dimming signal, whereby an analog dimming control is performed; and
         when the dimming signal does not exceed the first dimming threshold, the reference current signal is clamped to a level which corresponds to the first dimming threshold, and the second PWM signal is generated according to the level of the dimming signal, wherein a frequency of the second PWM signal is lower than a frequency of the first PWM signal; wherein the second PWM signal enables the first PWM signal to generate the switch control signal to control the power switch, wherein, during an enable period of the second PWM signal, the output current corresponds to the first dimming threshold, and during a disable period of the second PWM signal, the power switch is controlled to be OFF, whereby a pulse width modulation dimming control is performed.

2. The light emitting device driver apparatus of claim 1, wherein the modulation circuit includes:
   an error amplifier circuit, configured to operably generate an error amplified signal according to a difference between the current related signal and the reference current signal; and
   a first comparator circuit, configured to operably compare a first ramp signal and the error amplified signal to generate the first PWM signal.

3. The light emitting device driver apparatus of claim 1, wherein the dimming control circuit includes:
   a reference current generator circuit, configured to operably convert a dimming reference signal to generate a reference current signal;
   a signal selection circuit, configured to operably compare the dimming signal and the first dimming threshold, wherein when the dimming signal exceeds the first dimming threshold, the dimming signal is selected as the dimming reference signal, and when the dimming signal does not exceed the first dimming threshold, the first dimming threshold is selected as the dimming reference signal; and
   a second comparator circuit, configured to operably compare the dimming signal and a second ramp signal to generate the second PWM signal.

4. The light emitting device driver apparatus of claim 1, wherein when the dimming signal exceeds the first dimming threshold, the reference current signal is proportional to the dimming signal by a predetermined ratio.

5. The light emitting device driver apparatus of claim 3, wherein a peak level of the second ramp signal is equal to the first dimming threshold.

6. The light emitting device driver apparatus of claim 2, wherein the error amplifier circuit includes:
   a transconductance circuit, configured to operably generate an error amplified current on a transconductance output terminal according to the difference of the current related signal and the reference current signal;
   a compensation capacitor, configured to operably integrate the error amplified current to generate the error amplified signal; and
   an integrator control switch, coupled between the transconductance output terminal and the compensation capacitor, wherein, when the dimming signal exceeds the first dimming threshold, the integrator control switch is controlled to conduct a current path from the error amplified current to the compensation capacitor, and when the dimming signal does not exceed the first dimming threshold, the integrator control switch is controlled to conduct the current path from the error amplified current to the compensation capacitor during the enable period of the second PWM signal, and is controlled to cut off the current path from the error amplified current to the compensation capacitor during the disable period of the second PWM signal.

7. The light emitting device driver apparatus of claim 1, wherein the light emitting device circuit includes:
   a light emitting device string, including a least one light emitting device; and
   an output capacitor, coupled to the light emitting device string in parallel, for reducing a current ripple flowing through the light emitting device string.

8. The light emitting device driver apparatus of claim 1, wherein when the dimming signal exceeds a second dimming threshold, the reference current signal is clamped to a level which corresponds to the second dimming threshold, whereby the output current is clamped to an upper current limit.

9. The light emitting device driver apparatus of claim 1, wherein the conversion control circuit receives the dimming signal through a single pin to achieve the analog dimming control and the pulse width modulation dimming control according to the level of the dimming signal.

10. The light emitting device driver apparatus of claim 1, wherein the conversion control circuit determines the first dimming threshold according to a deviation characteristic obtained from data of plural dimming control circuits.

11. A conversion control circuit, configured to operably control a light emitting device driver apparatus, the light emitting device driver apparatus including an inductor and a power switch which is coupled to the inductor, the power switch being configured to operably switch the inductor to convert an input power to generate an output current for driving a light emitting device circuit; the conversion control circuit, configured to operably control the power switch so as to control the light emitting device driver apparatus, comprising:
   a modulation circuit, configured to operably perform a pulse width modulation according to a current related signal and a reference current signal to generate a first PWM signal, wherein the modulation circuit controls the current related signal such that the current related signal corresponds to the reference current signal, wherein the current related signal relates to the output current;
   a logic driving circuit, configured to operably generate a switch control signal according to the first PWM signal and a second PWM signal to control the power switch to generate the output current; and
   a dimming control circuit, configured to operably generate the reference current signal according to a dimming signal,
   wherein:
   when the dimming signal exceeds a first dimming threshold, the reference current signal is generated according to a level of the dimming signal, and the switch control signal controls the power switch according to the first PWM signal, such that the output current corresponds to the level of the dimming signal, whereby an analog dimming control is performed; and
   when the dimming signal does not exceed the first dimming threshold, the reference current signal is clamped to a level which corresponds to the first dimming threshold, and the second PWM signal is generated according to the level of the dimming signal, wherein a frequency of the second PWM signal is lower than a frequency of the first PWM signal; wherein the second PWM signal enables the first PWM signal to generate the switch control signal to control the power switch, wherein, during an enable period of the second PWM signal, the output current corresponds to the first dimming threshold, and during a disable period of the second PWM signal, the power switch is controlled to be OFF, whereby a pulse width modulation dimming control is performed.

12. The conversion control circuit of claim 11, wherein the modulation circuit includes:
    an error amplifier circuit, configured to operably generate an error amplified signal according to a difference between the current related signal and the reference current signal; and
    a first comparator circuit, configured to operably compare a first ramp signal and the error amplified signal to generate the first PWM signal.

13. The conversion control circuit of claim 11, wherein the dimming control circuit includes:
    a reference current generator circuit, configured to operably convert a dimming reference signal to generate a reference current signal;
    a signal selection circuit, configured to operably compare the dimming signal and the first dimming threshold, wherein when the dimming signal exceeds the first dimming threshold, the dimming signal is selected as the dimming reference signal, and when the dimming signal does not exceed the first dimming threshold, the first dimming threshold is selected as the dimming reference signal; and
    a second comparator circuit, configured to operably compare the dimming signal and a second ramp signal to generate the second PWM signal.

14. The conversion control circuit of claim 11, wherein when the dimming signal exceeds the first dimming threshold, the reference current signal is proportional to the dimming signal by a predetermined ratio.

15. The conversion control circuit of claim 13, wherein a peak level of the second ramp signal is equal to the first dimming threshold.

16. The conversion control circuit of claim 11, wherein the error amplifier circuit includes:
    a transconductance circuit, configured to operably generate an error amplified current on a transconductance output terminal according to the difference of the current related signal and the reference current signal;
    a compensation capacitor, configured to operably integrate the error amplified current to generate the error amplified signal; and
    an integrator control switch, coupled between the transconductance output terminal and the compensation capacitor, wherein, when the dimming signal exceeds the first dimming threshold, the integrator control switch is controlled to conduct a current path from the error amplified current to the compensation capacitor, and when the dimming signal does not exceed the first dimming threshold, the integrator control switch is controlled to conduct the current path from the error amplified current to the compensation capacitor during the enable period of the second PWM signal, and is controlled to cut off the current path from the error amplified current to the compensation capacitor during the disable period of the second PWM signal.

17. The conversion control circuit of claim 11, wherein when the dimming signal exceeds a second dimming threshold, the reference current signal is clamped to a level which corresponds to the second dimming threshold, whereby the output current is clamped to an upper current limit.

18. The conversion control circuit of claim 11, wherein the conversion control circuit receives the dimming signal through a single pin to achieve the analog dimming control and the pulse width modulation dimming control according to the level of the dimming signal.

19. The conversion control circuit of claim 11, wherein the conversion control circuit determines the first dimming threshold according to a deviation characteristic obtained from data of plural dimming control circuits.

* * * * *